US006434009B1

(12) United States Patent
Culp

(10) Patent No.: US 6,434,009 B1
(45) Date of Patent: Aug. 13, 2002

(54) POWER DISTRIBUTION MODULE WITH REVERSIBLE RELAY FOOTPRINT

(75) Inventor: Raymond C. Culp, Austintown, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/921,676

(22) Filed: Aug. 3, 2001

(51) Int. Cl.$^7$ .............. H05K 7/06; H05K 7/08; H05K 1/05

(52) U.S. Cl. .............. 361/728; 174/255; 361/736; 361/760; 361/777

(58) Field of Search .................. 361/601, 772, 361/773, 774, 819, 728, 729, 731, 736, 160; 439/810–814; 174/254; 335/78–86, 128

(56) References Cited

U.S. PATENT DOCUMENTS

| 4,930,047 A | * | 5/1990 | Peterson ................. 361/395 |
| 4,995,818 A | | 2/1991 | Saimoto |
| 5,023,752 A | | 6/1991 | Detter et al. |
| 5,310,353 A | * | 5/1994 | Parrish et al. ............. 439/376 |
| 6,015,302 A | * | 1/2000 | Butts et al. ............... 439/76.2 |
| 6,126,457 A | * | 10/2000 | Smith et al. ............... 439/76.2 |
| 6,191,672 B1 | * | 2/2001 | Lages et al. ............... 335/202 |

* cited by examiner

Primary Examiner—David Martin
Assistant Examiner—Dameon E. Levi
(74) Attorney, Agent, or Firm—Thomas N. Twomey

(57) ABSTRACT

A power distribution module utilizes a planar substrate having an array of repeating slots configured to accept two types of relays, one having four terminals and the other having five terminals. Both relays can mate with the slots of the substrate in a variety of orientations, including reverse orientations wherein the relay terminal footprint can be rotated 180 degrees and still mate with a corresponding, yet shifted, slot footprint.

12 Claims, 2 Drawing Sheets

POWER DISTRIBUTION MODULE WITH REVERSIBLE RELAY FOOTPRINT

TECHNICAL FIELD

This invention relates to power distribution modules and more particularly to power distribution modules having plug-in sockets for ISO relays.

BACKGROUND OF THE INVENTION

U.S. Pat. No. 5,023,752 granted to Gary C. Detter et al Jun. 11, 1991 discloses an electrical power distribution center that supports electronic and electrical devices including a number of relay devices that are controlled by electrical signals to position contacts for supplying power from a power source to auxiliary electrical systems of an electrical supply system for an automobile or other vehicle. The relay devices have four blade terminals in a unique pattern consisting of three parallel blade terminals in a triangular pattern and a fourth blade terminal perpendicularly arranged at the base of the triangle. The socket pattern for receiving the four blades of the relay terminal is shown in FIG. 1 of the '752 patent and in FIG. 1 of U.S. Pat. No. 4,995,818 granted to Tetsuro Saimoto Feb. 26, 1991 for a bus bar interlayer connector structure in a junction box.

The power distribution center and the junction box disclosed in the above patents are designed for a specific vehicle. Consequently each must be redesigned and retooled for other vehicles, or even related vehicles.

SUMMARY OF THE INVENTION

The object of this invention is to provide a power distribution module for the relays that are very versatile so that the same module can be used in a number of vehicles by repositioning the relays. The power distribution module utilizes a planar substrate having an array of slots configured to accept, preferably, two types of relays, one having four terminals and the other having five terminals. Both relays can mate with the slots of the substrate in a variety of orientations, including reverse orientations wherein the relay terminal footprint can be rotated 180 degrees and still mate with a corresponding, yet shifted, slot footprint.

The planar substrate of the module is divided into three portions being two end portions and a middle portion or repeating cell. Each end portion has an end slot centered laterally along the substrate. Each cell has a first sub-cell and a mirror image second sub-cell. Each sub-cell has three longitudinal rows of slots. The outer rows, or first and third rows each have a pair of co-linear slots, and the middle or second row has a lateral slot and a longitudinal slot. All slots are appropriately spaced forming a variety of slot footprints to mate with the footprint (i.e. four terminal configuration) of the terminals of the relays.

A feature of the invention is that the same relay can be plugged into the power distribution module in a number of different positions to perform different functions for different vehicle applications.

Another feature of the invention is the reduction of varying module designs between vehicle applications, thereby reducing manufacturing costs.

BRIEF DESCRIPTION OF THE DRAWINGS

The presently preferred embodiments of the invention are disclosed in the following description and accompanying drawings wherein.

DETAILED DESCRIPTION OF THE PREFERRED EMBODIMENTS

Figure 2:
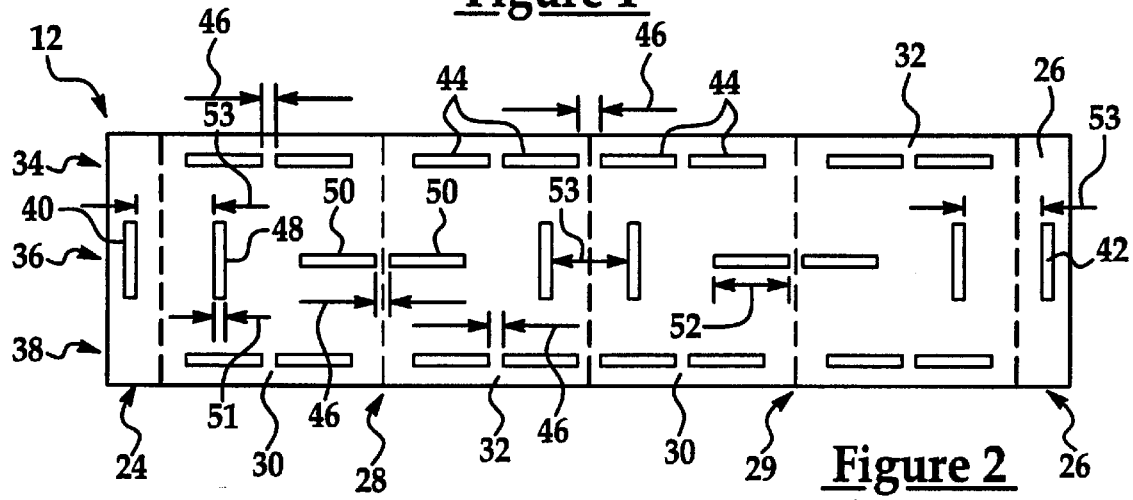
FIG. 2 is a plan view of a substrate of the power distribution module.

Referring now to the Figures, a power distribution module 10 comprises an electrically non-conductive housing or elongated planar substrate 12 having a series of equally proportioned slots 14. Mating with any number of the slots is a small standard ISO relay 16 having a four terminal configuration 18 and/or a large standard ISO relay 20 having the same four terminal configuration 18 plus an additional auxiliary terminal 22. The substrate 12 can be divided into generally three different quadrants being a first end portion 24, an opposite end portion 26 and at least one cell 28 disposed there-between. Each cell 28 has two mirror imaged sub-cells 30, 32 aligned back to back from one another. As best shown in FIG. 2, the present invention preferably has a first cell 28 and an identical second cell 29 aligned so that the second sub-cell 32 of the first cell 28 is located adjacent to the first sub-cell 30 of the second cell 29.

Defined by and extending longitudianlly along the elongated planar substrate 12 is a first, second and third row 34, 36, 38 of slots 14. The second row 36 is substantially centered between the first and third rows 34, 38. The first and second end slots 40, 42 are located at respective ends of the second row 36. Each sub-cell 30, 32 has a co-linear slot pair 44 in both the first row 34 and the third row 38. The slot pair 44 in the first row 34 is aligned axially or longitudinally to the slot pair 44 in the third row 38. The adjacent ends of the slots within the slot pair 44 are separated from each other by a common distance 46. Moreover, the slot pair 44 of the second sub-cell 32 of the first cell 28 is separated from the slot pair 44 of the first sub-cell 30 of the second cell 29 within the corresponding rows 34, 38 by the same distance 46.

The second row 36 of each sub-cell 30, 32 has a lateral slot 48 and a longitudinal slot 50 separated in a longitudinal direction and disposed perpendicular to one-another. Sub-cell 30 is aligned longitudinally and back-to-back with sub-cell 32 so that the longitudinal slot 50 of the first sub-cell 30 is adjacent to the longitudinal slot 50 of the second sub-cell 32 of the same cell and separated therefrom by the distance 46. Wherein each slot 14 is sized by a common dimensional width 51 and a length 52, the lateral slots 48 of the first sub-cell 30 of the first cell 28 is separated from the adjacent end slot 40 by a relay position shift length 53 which equals the length 52, plus the distance 46, and minus the width 51. Accordingly, the lateral slot 48 of the second sub-cell 32 of the second cell 29 is separated from the second end slot 42 by the shift length 53, and the side edge of the lateral slot 48 of the second sub-cell 32 of the first cell 28 is separated from the adjacent side edge of the lateral slot 48 of the first sub-cell 30 of the second cell 29 by the shift length 53. These separations permit mating of the small and large relays 16, 20 to the slots 14 across cell boundaries. The orientation of the first and second cells 28, 29 repeats when additional cells are added between end portions 24, 26.

Figure 3:
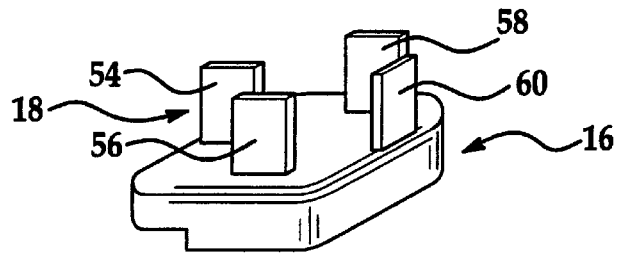
FIG. 3 is a perspective view of a small relay.
Figure 5:
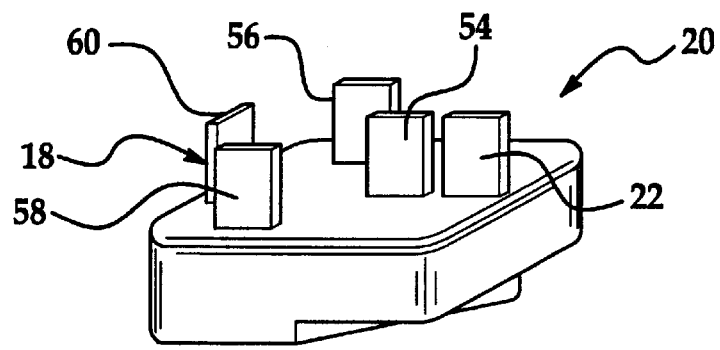
FIG. 5 is a perspective view of a large relay.

Referring to FIGS. 2, 3 and 5, the four terminal configuration 18 of the small and large relay 16, 20 each have a first terminal, a second terminal, a third terminal, and a fourth terminal 54, 56, 58, 60, which project substantially downward from the relays 16, 20 and into the slots 14 of the substrate 12. The first, second and third terminals 54, 56, 58 are parallel to one-another and are orientated to form a triangular shape. In assembly, the first terminal 54 is engaged or mated within a longitudinal slot 50 of the second row 36 of the substrate 12, regardless of the orientation of the relays 16, 20 to the substrate 12. However, depending upon the orientation of the relays 16, 20 the second terminal 26 may be mated to one of the slots of the co-linear slot pairs 44 in the first row 34, or in the third row 38. Likewise, the third terminal 38 may be mated to one of the slots 14 of the co-linear slot pair 44 of the alternate or remaining outside row, being the third row 38 or the first row 34.

The fourth terminal 60 is positioned perpendicular to the first terminal 54 near and outside of the base of the triangle. Fourth terminal 60 mates with any one of; the first end slot 40, the second end slots 42, and the lateral slots 48 within the second row 36 of the substrate 12. The fourth terminal 60 is located near the opposite edge of the relay 16 or relay 20 from the first terminal 54. The space between the first terminal 54 and the fourth terminal 60 is substantially equal to the shift length 53, plus the width 62, plus the space between the lateral slot 48 and the longitudinal slot 50 of the second row 36 of any sub-cell, as best shown in FIGS. 2 and 3. The distance between the second and third terminals 56, 58 is equal to the space between the slot pairs 44 of the first and third rows 34, 38 of the substrate 12. The large relay 20 has the four terminal configuration 18 plus an auxiliary or fifth terminal 61 which is adjacent to and co-linear with terminal 54 and is separated therefrom by the distance 46.

Figure 1:
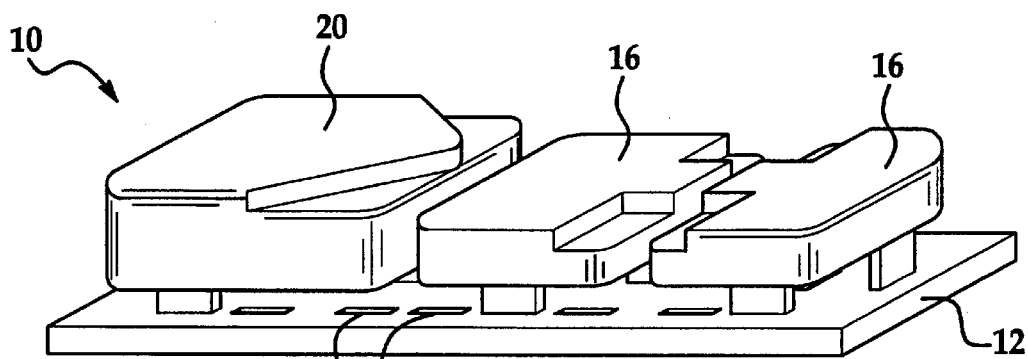
FIG. 1 is a perspective view of a power distribution module according to the invention.
Figure 4:
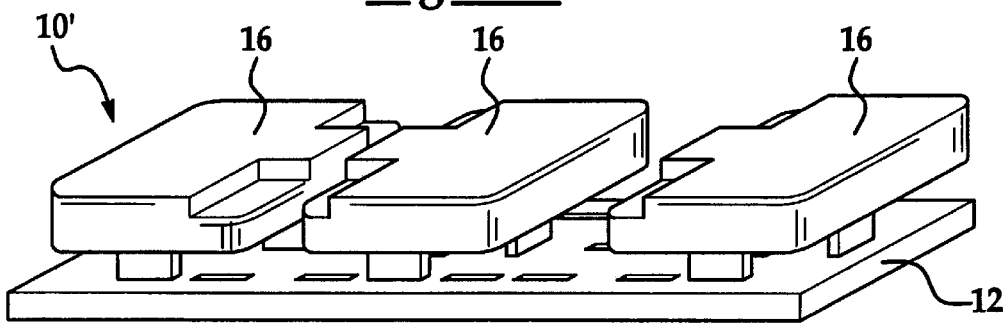
FIG. 4 is a perspective view of a second embodiment of the power distribution module.
Figure 6:
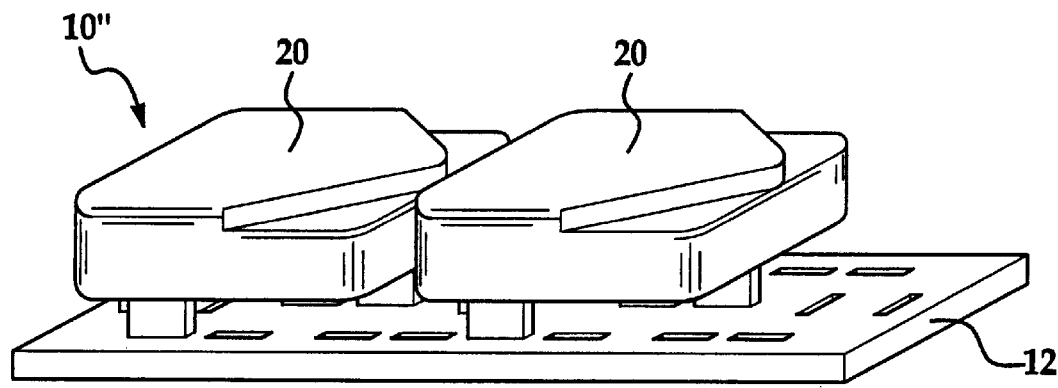
FIG. 6 is a perspective view of a third embodiment of the power distribution module.
Figure 7:
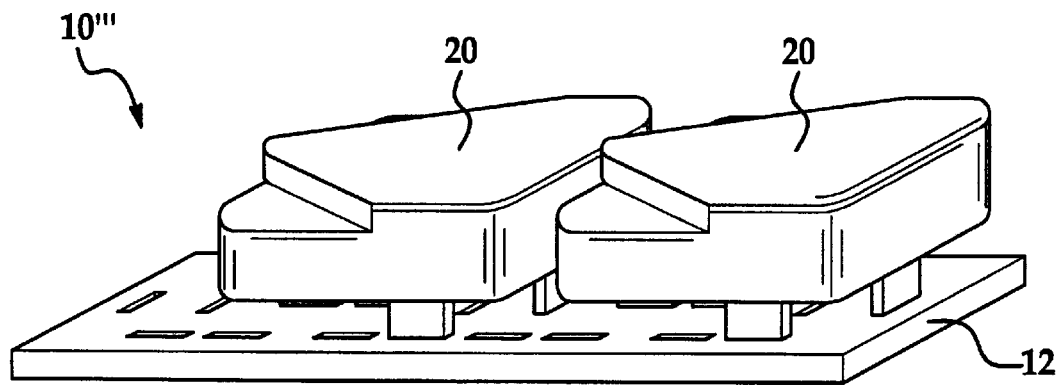
FIG. 7 is a perspective view of a fourth embodiment of the power distribution module.

Referring to FIG. 4, a second embodiment of module 10' is illustrated, wherein a maximum of three small relays 16 can mate with the substrate 12 at any one time. Because the small relay 16 can be rotated 180° and still have the capability to mate with the slots 14 of the substrate 12, relay 16 can be orientated onto the substrate 12 in eight different positions. As best shown in FIGS. 6 and 7, a third and fourth embodiment is illustrated wherein the large relay 20 is capable of mating with the substrate 12 in four different positions. This also accounts for the ability to reverse or rotate the relay 20 by 180°. A maximum of two large relays 20 can mate to the substrate 12 at any one time. Module 10" of the third embodiment shows the fifth terminal 61 mated to the longitudinal slots 50 of the first sub-cells 30, and module 10'" of the fourth embodiment shows the fifth terminal 61 mated to the longitudinal slots of the second sub-cells 32. Moreover, any variety of small and large relays 16, 20 can mate with the substrate 12 at any one time, as best shown in the first embodiment of FIG. 1. It is this large variety of relay orientations that provides flexibility in the power distribution module 10 thereby eliminating design changes between vehicle applications.

Although the preferred embodiments of the present invention have been disclosed, various changes and modifications may be made thereto by one skilled in the art without departing from the scope and spirit of the invention as set forth in the appended claims. It is also understood that the terms used herein are merely descriptive, rather than limiting, and that various changes may be made without departing from the scope and spirit of the invention.

What is claimed is:

1. A power distribution module comprising:
  a planar elongated non-conductive substrate having a cell, a first end slot and a second end slot, the first and second end slots separated by the cell and disposed at either end of the substrate, the first and second end slots each extended and centered laterally along the substrate; and
  the cell having a first sub-cell aligned longitudinally with a second sub-cell, the first sub-cell being a mirror image of the second sub-cell, the first and second sub-cells each having a first longitudinal row of slots, a second longitudinal row of slots and a third longitudinal row of slots, the second row disposed between the first row and the third row, the first row and the third row each having two co-linear slots, the second row having a lateral slot and a longitudinal slot.

2. The module set forth in claim 1 wherein the two co-linear slots of the first row are aligned laterally with the two co-linear slots of the third row.

3. The module set forth in claim 2 wherein the two co-linear slots of the first row are separated by a distance, and the two co-linear slots of the third row are separated by the distance.

4. The module set forth in claim 3 wherein the longitudinal slot of the second row of the first sub-cell is separated from the longitudinal slot of the second row of the second sub-cell by the distance.

5. The module set forth in claim 4 wherein the first end slot is separated from the lateral slot of the second row of the adjacent first sub-cell by a shift length, and wherein the second end slot is separated from the lateral slot of the second row of the adjacent second sub-cell by the shift length, the shift length being equal to a length of the slot, plus the distance and minus a width of the slot, wherein all the slots are equal in dimension.

6. The module set forth in claim 5 further comprising a plurality of cells disposed between the first and second end slots, the cell being one of the plurality of cells.

7. The module set forth in claim 6 wherein the lateral slot of the second row of the second sub-cell of one cell is separated from the lateral slot of the second row of the first sub-cell of the adjacent cell by the shift length.

8. The module set forth in claim 7 wherein the plurality of cells are two cells.

9. The module set forth in claim 8 further comprising a small relay having a four terminal configuration, the four terminal configuration mated to the corresponding slots of the substrate.

10. The module set forth in claim 8 or 9 further comprising a large relay having the four terminal configuration and a fifth terminal mated to the corresponding slots of the substrate.

11. The module set forth in claim 10 wherein the four terminal configuration has a first terminal, a second terminal, a third terminal, and a fourth terminal, the first, second and third terminals disposed parallel to one-another and each extended longitudinally with respect to the substrate, the first, second and third terminals being orientated in a triangular formation, the second and third terminals disposed longitudinally between the first and fourth terminals, the fourth terminal being perpendicular to the first terminal.

12. The module set forth in claim 11 wherein the fifth terminal of the large relay is co-linear to the first terminal of the four terminal configuration, and wherein the fifth terminal is separated from the first terminal by the distance.

* * * * *